No. 727,350. PATENTED MAY 5, 1903.
J. W. GRAEME.
CONDIMENT HOLDER.
APPLICATION FILED DEC. 2, 1902.
NO MODEL.
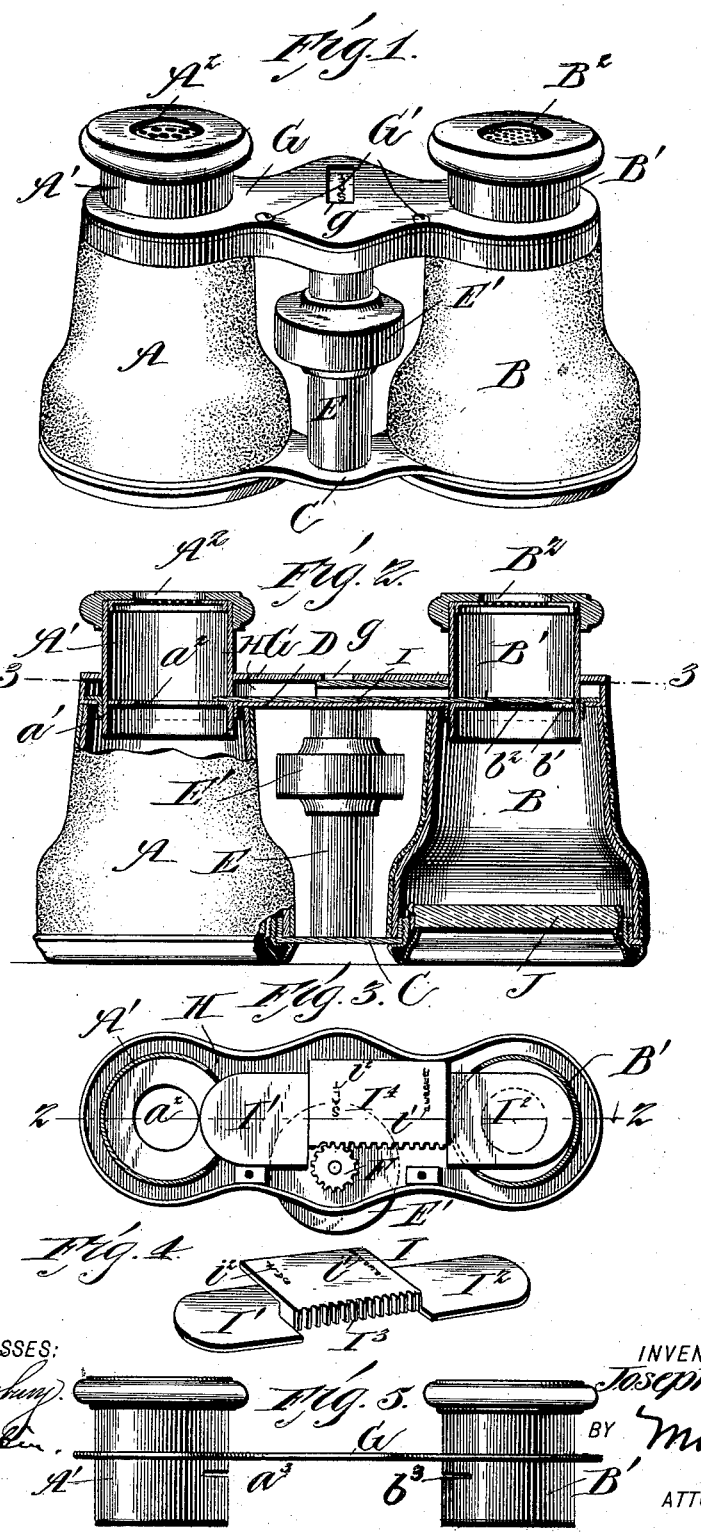

No. 727,350. Patented May 5, 1903.

UNITED STATES PATENT OFFICE.

JOSEPH W. GRAEME, OF WASHINGTON, DISTRICT OF COLUMBIA.

CONDIMENT-HOLDER.

SPECIFICATION forming part of Letters Patent No. 727,350, dated May 5, 1903.

Application filed December 2, 1902. Serial No. 133,610. (No model.)

*To all whom it may concern:*

Be it known that I, JOSEPH W. GRAEME, a citizen of the United States, and a resident of Washington, in the District of Columbia, have made certain new and useful Improvements in Condiment-Holders, of which the following is a specification.

My invention is an improvement in condiment-holders, being in the nature of a combined pepper and salt holder, made in the similitude of an opera-glass and preferably including means whereby the discharge of one or the other box may be closed and that of the other box simultaneously opened; and the invention consists in certain novel constructions and combinations of parts, as will be hereinafter described and claimed.

In the drawings, Figure 1 is a perspective view of a holder embodying my invention. Fig. 2 is a side elevation thereof, partly in section. Fig. 3 is a cross-sectional view on about line 3 3 of Fig. 2. Fig. 4 is a detail perspective view of the cut-off plate, and Fig. 5 is a detail side elevation of the discharge-section of the holder.

The holder includes the boxes A and B, made somewhat in cylindrical form and extending parallel with each other and connected by the cross-bars C and D, whereby the holder presents the appearance of an opera-glass, as will be understood from Figs. 1 and 2.

The bars C and D form bearings for the post or shaft E, having the finger-wheel E' and provided above the bar D with the pinion F, which meshes with and operates the cut-off plate shown in Fig. 4.

In constructing a holder I prefer to make it with the body-section comprising the two boxes A and B and the connecting devices and with the top section including the necks A' and B' and the cross connecting-plate G, extending between the said necks, as shown. The upper end of the body-section is recessed at H and the cross-plate G forms a cover for said recess and is preferably secured in place by means of the screws G', (see Fig. 1,) which operate to unite the upper and lower sections of the boxes and inclose the cut-off plate which operates between the plates D and G, as will be understood from Figs. 2 and 3.

The necks A' and B' are provided at $A^2$ and $B^2$ with perforations for the discharge of the salt or pepper and are controlled below their discharge ends by the end portions I' and $I^2$ of the cut-off plate I, which plate is provided between the said end portions with a rack $I^3$, meshed by the pinion F, and with a name-plate $I^4$, on which are inscribed the condiments, as shown at $i$ and $i'$, such words being arranged to show through a sight-opening $g$ in the plate G when the cut-off plate is properly adjusted. Thus in the position of parts shown in Figs. 1, 2, and 3 the word "Salt" will be exposed through the sight-opening, the cut-off plate being adjusted to permit the discharge of salt from the openings $A^2$ and to cut off the discharge of pepper through the openings $B^2$. By preference the cut-off plate operates across diaphragms $a'$ and $b'$ in the necks A' and B', such diaphragms being perforated at $a^2$ and $b^2$, so the plate can be adjusted to cover such openings or leave same unobstructed, as desired.

The cut-off plate operates at its end portions through slots $a^3$ and $b^3$ in the inner sides of the necks A' and B' below the plate G, as shown in Figs. 2 and 5 of the drawings.

It will be noticed that the devices for operating the cut-off plate are inclosed and are not exposed to view, so they do not detract from the resemblance of the holder to an opera-glass. This appearance is also heightened by making the bottoms of the boxes in the form of lenses, as shown at J in Fig. 2, which construction also enables one to see at a glance whether the holder is supplied with the condiments.

Having thus described my invention, what I claim as new, and desire to secure by Letters Patent, is—

1. A condiment-holder substantially as herein described comprising the body-section provided with the opposite boxes extending approximately parallel with each other, plates connecting said boxes, a recess being provided in the upper end of the body for the cut-off plate, the shaft or post journaled in the connecting-plates and provided with a finger-wheel and having above the upper connecting-plate a pinion operating in the recess at the upper end of the body portion, the upper section having the opposite necks registered with the boxes of the body-section, and the connecting-plate forming a cover for the recess in the upper end of the body-section and provided with a sight-opening, the perforated discharge-plates for the said necks, and the cut-off plate operating in the recess in the upper end of the body-section and having end portions adapted to cut off the discharge from the opposite necks, a rack for engagement by the pinion on the shaft of the body-section, and a plate inscribed with the names of the condiments and arranged to expose the same through the sight-opening in the connecting-plate of the top section substantially as set forth.

2. A condiment-holder comprising the opposite boxes provided with perforated discharges for the condiments, a cut-off plate extending between the opposite boxes and having a rack at its middle portion, and a shaft operating between the opposite boxes and provided with a pinion meshing with said rack whereby to shift the cut-off plate to shut off the discharge from either of said boxes substantially as set forth.

3. A condiment-holder comprising the opposite parallel, spaced-apart boxes, the intermediate shaft between and parallel with the boxes, a cut-off plate by which to shut off the discharge from either box, and means whereby the cut-off plate may be operated by the intermediate shaft substantially as set forth.

JOSEPH W. GRAEME.

Witnesses:
HARRISON B. BROWN,
SOLON C. KEMON.